United States Patent [19]

Jakubiec et al.

[11] Patent Number: 4,957,018

[45] Date of Patent: Sep. 18, 1990

[54] MECHANISM FOR SELECTIVELY LOCKING AND UNLOCKING A TRANSLATABLE SHAFT

[75] Inventors: Antoni F. Jakubiec, San Mateo; Thomas M. Daley, San Jose, both of Calif.

[73] Assignee: Varian Associates, Inc., Palo Alto, Calif.

[21] Appl. No.: 484,951

[22] Filed: Feb. 26, 1990

Related U.S. Application Data

[63] Continuation of Ser. No. 326,398, Mar. 2, 1989, Pat. No. 4,903,937.

[51] Int. Cl.$^5$ .............................................. G05G 5/06
[52] U.S. Cl. ........................................ 74/531; 251/89; 251/297
[58] Field of Search ................... 137/624.27; 74/531; 251/89, 297

[56] References Cited

U.S. PATENT DOCUMENTS

| | | | |
|---|---|---|---|
| 3,115,330 | 12/1963 | Dollison | 137/624.27 X |
| 3,866,880 | 2/1975 | Schexnayder | 137/624.27 X |
| 3,891,182 | 6/1975 | Schwerin | 251/297 |
| 4,309,022 | 1/1982 | Reinicke | 74/531 X |

*Primary Examiner*—Alan Cohan
*Attorney, Agent, or Firm*—Stanley Z. Cole; Allan M. Lowe

[57] ABSTRACT

A mechanism for locking and unlocking a reciprocating shaft includes a plate fixed to the shaft having an inclined surface. A housing surrounds the shaft and plate having a wall surrounding the inclined surface. A set of balls is located between the inclined surface and the housing wall. An assembly is translatable relative to the shaft and is biased by a spring to jam the balls between the inclined surface and the housing wall to lock the shaft against reciprocation. The assembly is movable against the force of the spring by a fluid pressure actuated cylinder to move the balls away from the inclined surface to unlock the shaft.

22 Claims, 5 Drawing Sheets

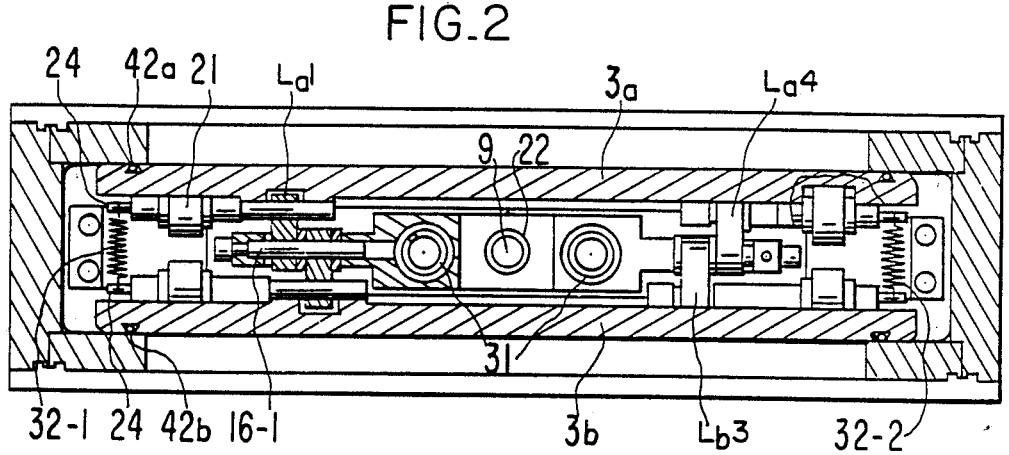
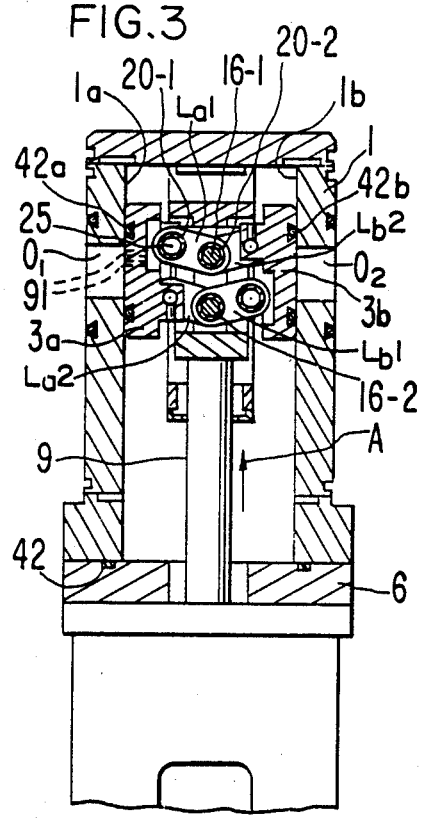
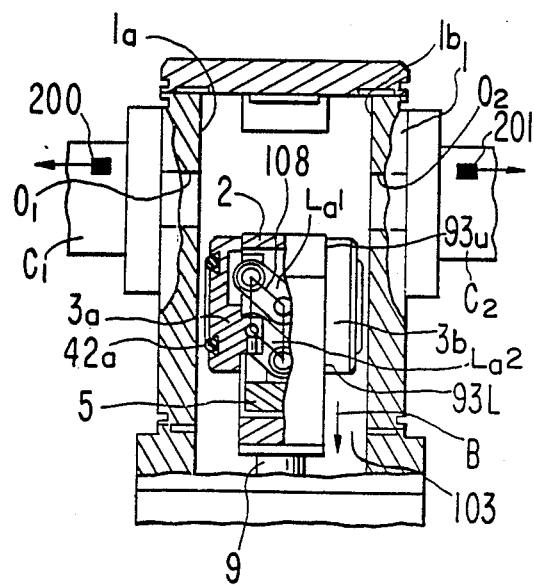

MECHANISM FOR SELECTIVELY LOCKING AND UNLOCKING A TRANSLATABLE SHAFT

This is a continuation of application Ser. No. 326,398, filed Mar. 21, 1989, now U.S. Pat. No. 4,903,937, issued Feb. 27, 1990.

FIELD OF THE INVENTION

This invention relates to an isolation valve and in particular, to an isolation valve suitable for both vacuum and non-vacuum applications in a semiconductor processing environment.

BACKGROUND OF THE INVENTION

Vacuum gate valves are used in a variety of applications. In certain of these applications, high speed, high reliability, long life and low particulate generation are of the utmost importance. This is particularly true in processing systems for semiconductor wafers wherein vacuum gate valves are employed to provide isolation between loadlocks and process chambers and betweeen different process chambers within the processing system. Recent trends in semiconductor processing include systems with a large number of vacuum processing modules interconnected by gate valves. See, for example, U.S. patent application Ser. No. 856,738 entitled "Modular Semiconductor Wafer Transport and Processing System", assigned to the assignee of the present invention. As these wafer processing systems become more complex and incorporate more vacuum gate valves, the reliability, long life and low particulate generation of the valve assumes greater importance since failure of a single valve may cause downtime for the entire system and excessive particulates generated by a particular valve may tend to contaminate the entire system.

It is a general object of the present invention to provide a new and improved vacuum gate valve providing long life with low particulate generation.

SUMMARY OF THE INVENTION

An isolation valve is disclosed which includes a housing having a first port and a first seal member (seal plate) for sealing the first port. The first seal member is linked to a shaft which carries a guide means. To close the port, the shaft is first driven along its central axis in a first direction from a first position wherein the port is open and the guide means is not in contact with stops attached to the housing to a second position wherein the guide means contacts the stops. The shaft is then driven further along its central axis to a third position.

As the shaft moves from its first position to the second position, a compression spring between the guide means and the shaft exerts a force between them which maintains the seal plate in a retracted position.

As the shaft moves from the second position to the third position, the shaft moves relative to the guide means, and a mechanism linking the seal plate to the shaft causes the seal plate to be extended from its retracted position to an extended position for sealing the port.

The guide means causes the motion of the sealing member to be perpendicular to a surface of the housing containing the port as the seal member seals the port. Rollers (cam followers) attached to the seal plate ride on the guide means, eliminating sliding friction between the guide means and the plate.

To open the port, the shaft is driven along its central axis in the opposite direction which causes the seal plate to retrace its path of motion, first being retracted as the shaft is driven from the third position to the second position and then being translated as the shaft is driven from its second position to its first position.

In one preferred embodiment, the valve includes a second seal member for sealing a second port in the housing. The second seal member is attached to the shaft by a linking mechanism. The motion of the second seal plate is the mirror image of the motion of the first plate with respect to the plane containing the central axis of the shaft and parallel to the flat parallel surfaces of the housing containing the first and second ports. An extension spring between the first and second seal members supplies a force which continually acts to retract the seal plates, eliminating play in the linking mechanism and extending the life of the O-rings embedded in the seal members.

A locking mechanism is provided which prevents opening of the valve in response to a signal indicating an undesired condition of the driving mechanism, such as a loss of pressure in an air cylinder driving the shaft. This locking mechanism is located externally to a vacuum chamber containing the sealing member. This placement of the locking mechanism reduces the size of the portion of the valve in the vacuum chamber and eliminates particulate generation by the locking mechanism in a vacuum environment.

A controller selects the magnitude of the force applied to the shaft by the driving mechanism. This permits valve life to be greatly extended by selecting a smaller force when the valve is sealing in an environment having approximately equal pressures on both sides of the valve and a larger force when the valve is sealing in an environment having unbalanced pressures on each side of the valve.

For example, in one embodiment, the driving means is an air cylinder which is driven by an air supply at 45 psi when there is a vacuum in chambers on opposite sides of the valve and at 80 psi when there is a vacuum in a chamber on one side of the valve and atmospheric pressure in a chamber on the other side of the valve.

These and other features of the invention may be more fully understood by reference to the drawings and accompanying Detailed Description.

BRIEF DESCRIPTION OF THE DRAWINGS

FIGS. 2 and 3 show cross-sections of the valve of FIG. 1 along mutually orthogonal planes perpendicular to the plane of the cross-section of FIG. 1;

FIG. 4 shows a cross-section of valve 100 with valve mechanism 101 in its open position in housing 1;

DETAILED DESCRIPTION

Figure 1:
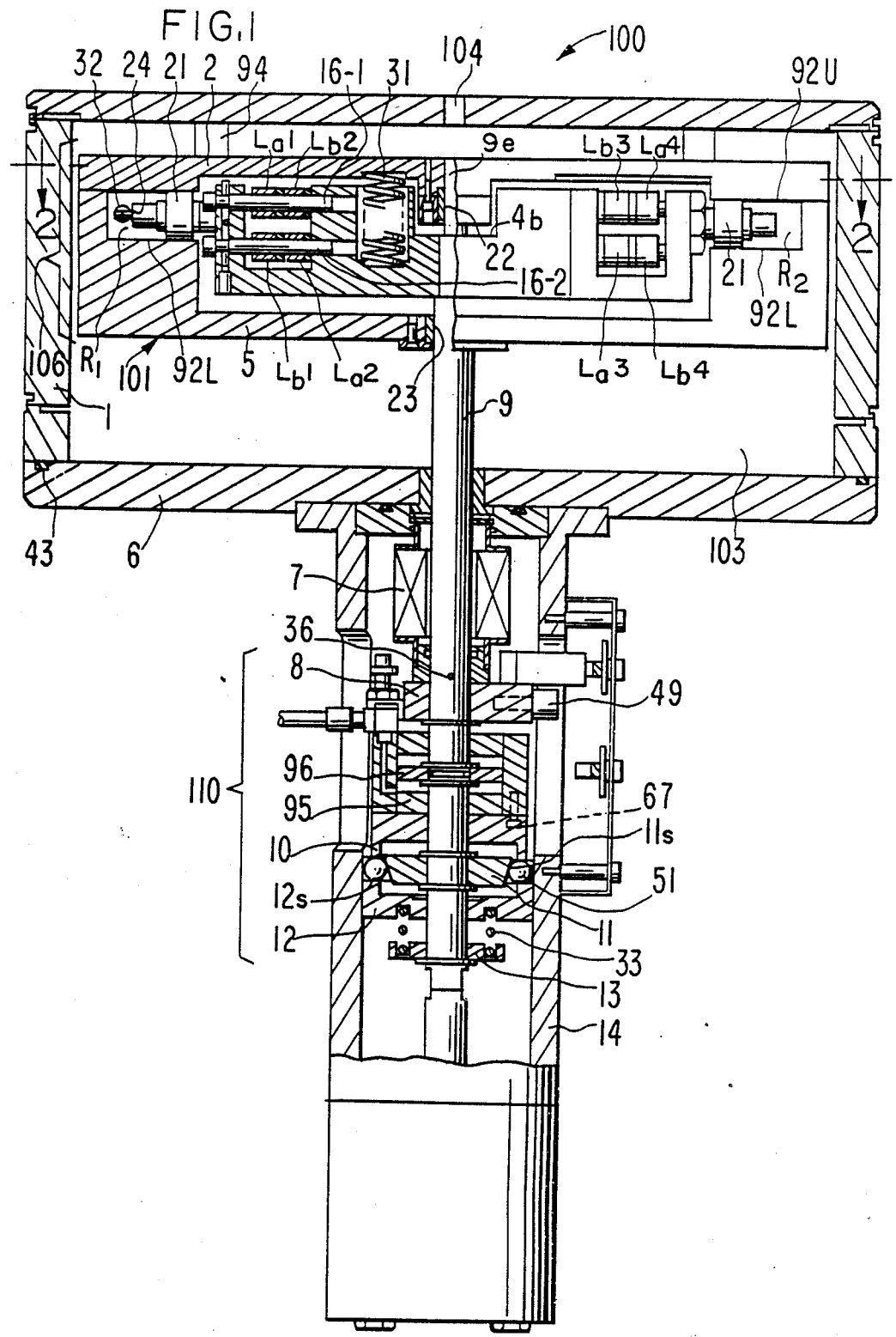
FIG. 1 shows a cross-section of one embodiment of valve 100 of the present invention.

FIG. 1 shows a cross-section of one embodiment of valve 100 of the present invention. FIGS. 2 and 3 are cross-sections of the valve of FIG. along mutually orthogonal planes perpendicular to the plane of the cross-section of FIG. 1. FIGS. 1–3 show the valve mechanism 101 in its closed position within housing 1 with seal plates 3a and 3b pressed against interior surfaces 1a and 1b, respectively, of housing 1.

FIG. 4 shows a cross-section of valve 100 with valve mechanism 101 in its open position in housing 1, thus providing communication between ports $O_1$ and $O_2$ in housing 1. Typically, ports $O_1$ and $O_2$ communicate with chambers $C_1$ and $C_2$, respectively, one or more of which may be a vacuum chamber.

Figure 5A:
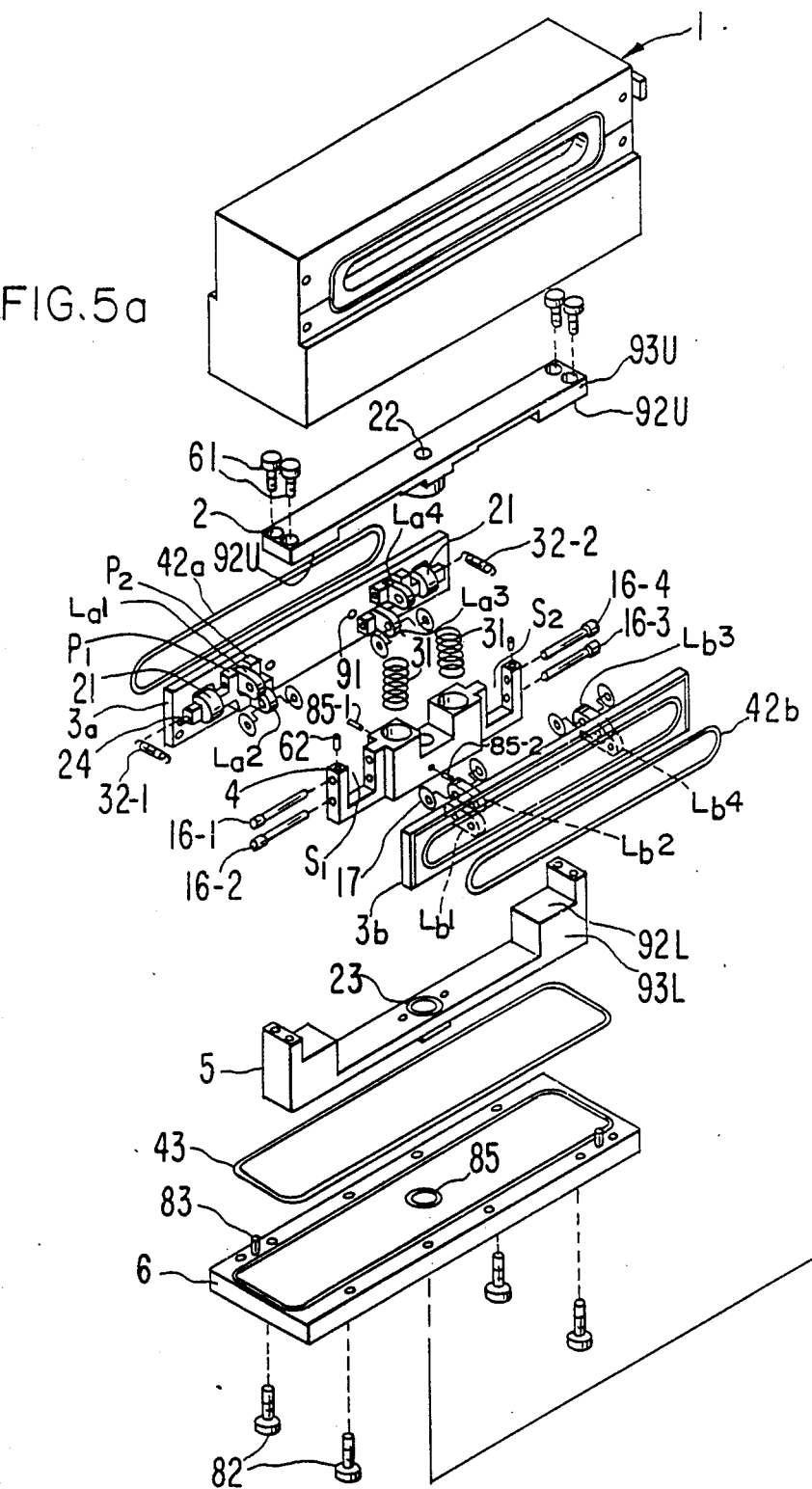
FIGS. 5a, 5b and 5c show an exploded view of valve 100.
Figure 5B:
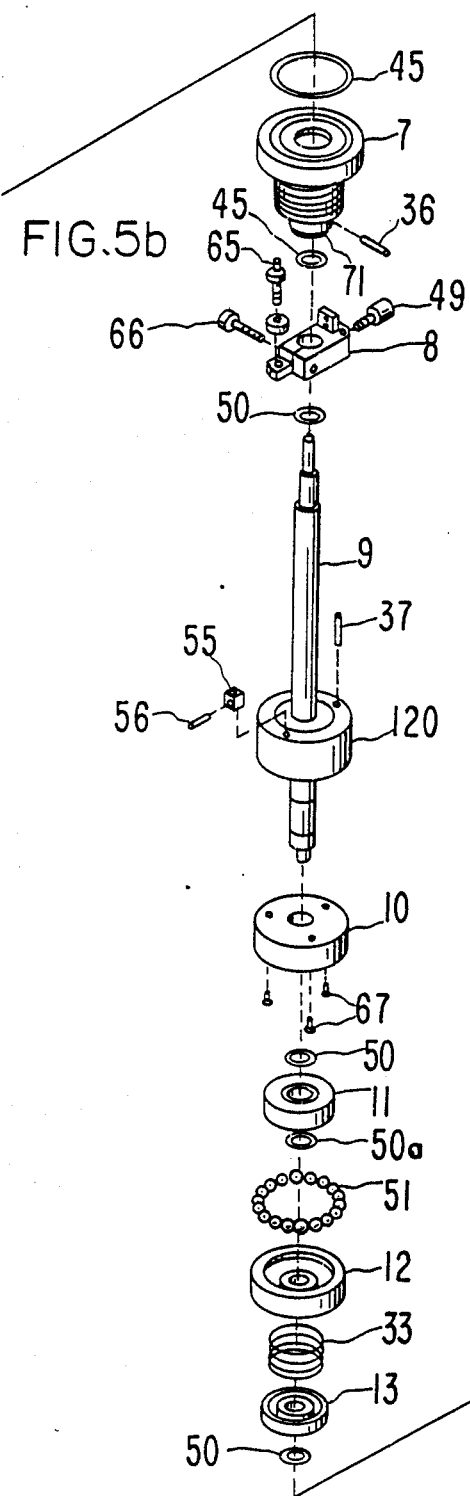
Figure 5C:
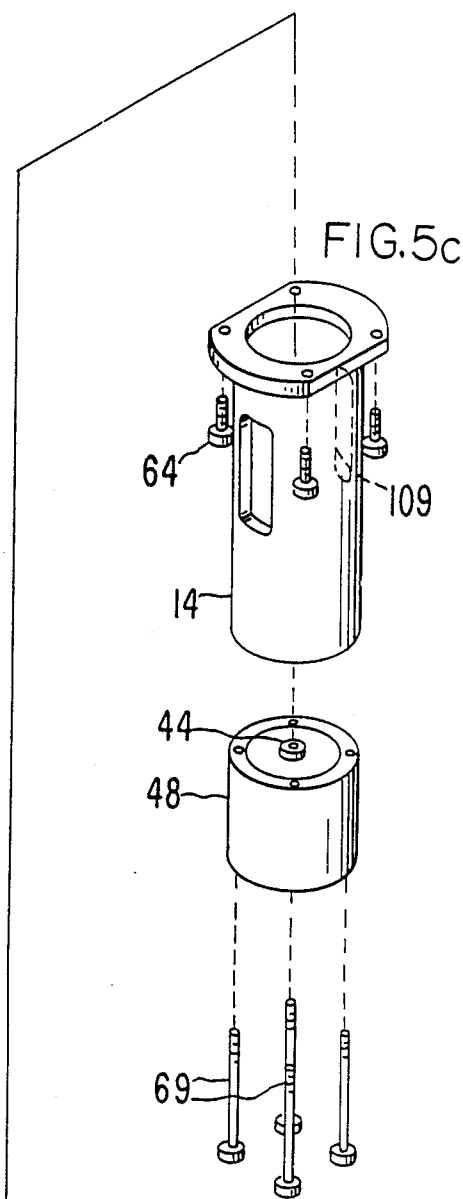

FIGS. 5a, 5b and 5c comprise an exploded view of valve 100. The same parts are designated by the same numbers in FIGS. 1–5c. The rigid valve parts may be made of stainless steel or any other suitable materials.

Mounting plate 6 is secured to housing 1 by four screws 82. O-ring 43 seated in mounting plate 6 forms a vacuum seal between housing 1 and mounting plate 6. Two locating pins 83 (FIG. 5a) protruding from plate 6 assure proper alignment of plate 6 with housing Valve shaft 9 extends through low friction bushing 85 which extends through mounting plate 6. Actuator block 4 of valve mechanism 101 is rigidly mounted on valve shaft 9 by a threaded connection (not shown) and secured with two set screws 85-1 and 85-2 and thus moves vertically with shaft 9 as indicated by arrows A and B in FIGS. 3 and 4, respectively. When actuator block 4 is mounted on shaft 9, end 9e (FIG. 1) protrudes above seat 4b of actuator block 4.

Sealing is accomplished by forcing rectangular seal plates 3a and 3b to press against internal surfaces 1a and 1b, respectively, of valve housing 1, thus sealing off rectangular ports $O_1$ and $O_2$ in housing 1. O-rings 42a and 42b are seated in seal plates 3a and 3b, respectively, and completely surround ports $O_1$ and $O_2$ when valve mechanism 101 is in its closed position.

If desired, housing 1 may be provided with opening 104 for communicating to a pumping mechanism (not shown) for evacuating valve chamber 103 internal to housing 1 to a selected pressure when valve mechanism 101 is in its closed position. Alternatively, if desired, one of the seal plates, e.g., seal plate 3a (FIG. 3) may be provided with two openings 91 for communicating chamber 103 to the chamber (e.g., $C_1$) associated with the seal plate so that valve chamber 103 may be evacuated to a selected pressure by pumping means (not shown) which pump chamber $C_1$.

Seal plate 3a is connected to actuator block 4 by means of generally rectangular links $L_a1$ through $L_a4$. Link $L_a1$ has two needle bearings 20-1 and 20-2. Link $L_a1$ is rotatably mounted to seal plate 3a by shaft 25 (FIG. 3) which extends through portion $P_1$, through needle bearing 20-1 and through portion $P_2$ (FIG. 5a) of seal plate 3a. Link $L_a1$ is rotatably mounted to actuator block 4 by means of shaft 16-1 which extends across seat $S_1$ of actuator block 4 through needle bearing 20-2. Each link $L_a2$, $L_3$3 and $L_a4$ is identical to link $L_1$ and each is rotatably mounted to seal plate 3a by a corresponding shaft through one of its needle bearings and is rotatably mounted to actuator block 4 by a corresponding shaft 16-2, 16-3 and 16-4, respectively, through the other of its needle bearings. The use of needle bearings assures smooth operation with very low generation of particulates and without sliding friction in the bearings.

Seal plate 3b is also connected to actuator block 4 by means of links $L_b1$ through $L_b4$. Again, each link $L_b1$ through $L_b4$ has two needle bearings and each link is rotatably attached to seal plate 3b by means of a corresponding shaft 25. Each link $L_b1$ through $L_b4$ is also rotatably mounted to actuator block 4 by one of shafts 16-1 through 16-4 which also attach links $L_a1$ through $L_a4$ to actuator block 4. In the exploded view of FIG. 5, links $L_a1$ through $L_a4$ have been labeled from left to right. Also links $L_b1$, $L_b2$, $L_b3$ and $L_b4$ are labeled from left to right. Links $L_b1$ through $L_b4$ are in horizontal register with links $L_a1$ through $L_a4$, respectively. When mounted on actuator block 4, link $L_b1$ is beneath link $L_a1$, link $L_b2$ is above link $L_a2$, link $L_b3$ is above link $L_3$3 and link $L_b4$ is beneath link $L_a4$. Shaft 16-1 mounts link $L_a1$ and link $L_b2$ to actuator block 4; shaft 16-2 mounts links $L_a2$ and $L_b1$ to actuator block 4; shaft 16-3 mounts links $L_3$3 and $L_b4$ to actuator block 4; and shaft 16-4 mounts links $L_a4$ and $L_b3$ to actuator block 4. Low friction washers 17 separate the links on each shaft from each other and from seal plate portions $P_1$ and $P_2$ of actuator block 4 to reduce generation of particles. The links are arranged so that they form four parallelograms and four toggle mechanisms at the same time. The parallelogram 108 including link $L_a1$ and $L_a2$ is shown in FIG. 4. Similarly, links $L_3$3 and $L_a4$ are contained in a parallogram (not shown in FIG. 4). Links $L_b1$ and $L_b2$ are contained in a third parallelogram and links $L_b3$ and $L_b4$ are contained in a fourth parallelogram (not shown). These parallelograms assure that seal plates 3 remain mutually parallel during opening and closing of the valve. The pairs of links attached to shafts 16-1, 16-2, 16-3 and 16-4 form four separate toggle mechanisms which assure that both seal plates 3a and 3b move at the same rate of speed in opposite directions. These toggle mechanisms also provide mechanical advantage which amplifies the force applied to shaft 9.

A pair of rollers 21 is mounted to each of seal plates 3a and 3b by a corresponding pair of shafts 24 which are fixedly mounted to seal plates 3a and 3b. Each of rollers 21 is provided with a needle bearing (not shown) to reduce particulate generation.

Actuator block 4 is surrounded by frame (guide means) 106. Frame 106 includes a lower guide block 5 and an upper guide block 2 which are bolted together by screw 61. Shaft 9 extends through blocks 2 and 5 by means of bushings 22 and 23. Upper and lower guide blocks 2 and 5 are dimensioned so that rollers 21 are accommodated by recesses $R_1$ and $R_2$ formed by the joining of the upper and lower guide blocks. The vertical dimensions of recesses $R_1$ and $R_2$ are defined by internal surfaces 92U and 92L of upper and lower blocks 2 and 5, respectively. These internal surfaces are perpendicular to the center line of shaft 9. Recesses $R_1$ and $R_2$ serve as a guide for rollers 21. Recesses $R_1$ and $R_2$ restrict movement of rollers 21 and hence, seal plate 3a and 3b to linear motion with respect to frame 106 in opposite directions perpendicular to the center line of shaft 9. In one embodiment the vertical dimension of recess $R_1$ and $R_2$ is approximately 0.001 greater than the diameter of roller (cam follower) 21. Protruding end 9e of shaft 9 provides a guide means for low friction bushing 22 rigidly installed in upper guide block 2.

Compression springs 31 extend between upper block 2 and actuator block 4 which exert force against upper block 2 and actuator block 4, spreading them apart and keeping them under preload. This preloading maintains seal plates 3a and 3b in their fully retracted position against surfaces 93U and 93L of frame 6 and links $L_a1$ through $L_a4$ and $L_b1$ through $L_b4$ at their maximum angle of inclination with respect to the horizontal as shown in FIG. 4 until upward movement of shaft 9 causes frame 6 to contact stops 94.

Two extension springs 32-1 and 32-2 are connected between shafts 24 on seal plates 3a and 3b, respectively, and exert additional retracting forces on seal plates 3a and 3b at all times. Extension springs 32-1 and 32-2 eliminate play between shafts 25 and needle bearings 20-1 in all of the links and between shafts 16-1 through 16-4 and needle bearings 20-2 and prevent any rotational motion of plates 3a and 3b during their extension or retraction. While valve 100 is operational without the presence of the extension springs, and one embodiment was successfully tested for approximately 50,000 cycles before failure, the presence of springs 32-1 and 32-2 has greaty extended valve life. Three embodiments with these extension springs have each been tested for over 2.5 million cycles at 10 cycles per minute without failure. The valve can be cycled at a rate of up to at least 40 cycles per minute.

Alignment of valve assembly 101 is controlled by actuator block 4 which is rigidly mounted on shaft 9. Anti-rotation clamp 8 with cam follower 49 is secured to shaft 9 by means of screw 66. Cam follower 49 is guided by vertical slot 109 in actuator housing 14, preventing rotation of shaft 9 about its central axis and providing proper alignment for actuator block 4, and thus, valve assembly 101. Shaft 44 of actuator 48 screws onto shaft 9. Actuator 48 is mounted to actuator housing 14 by screws 69. Housing 14 is secured to mounting plate 6 by screws 64.

Bellows assembly 7 is used as a vacuum feedthrough. Pin 36 extends through shaft 9 through a circumferential slot (not shown) in flange 71 of bellows 7. Pin 36 retains bellows 7 to shaft 9, preventing axial movement of flange 71 with respect to shaft 9, while allowing a small amount of rotational movement to release torsional stress within bellows 7. This feature increases bellows life. O-rings 45 provide a vacuum seal.

Valve 100 is shown in its open position in FIG. 4. In this position, seal plates 3a and 3b are retracted and rest against side surfaces 93U and 93L of upper block 2 and lower block 5, allowing communication between chambers $C_1$ and $C_2$ through ports $O_1$ and $O_2$. In this lowered position an arm (not shown) located in one of chambers $C_1$ or $C_2$ may be extended through chamber 103 to the other chamber.

To move valve 100 to its closed position shown in FIGS. 1-3, shaft 44 (FIG. 5c) of main actuator 48 is extended which causes shaft 9 and attached actuator block 4 and frame 106 supported thereon to move upward together until upper guide block 2 of frame 106 bottoms against stops 94 attached to housing 1. In one embodiment actuator 48 is an air cylinder and shaft 44 is the cylinder rod. Alternatively, shaft 44 may be driven by a linear motor or by hydraulic means or any other means, such as a lead screw, for providing linear motion. Up until the time when guide block 2 contacts stops 94 (which may be provided with polyimide buttons, not shown), seal plates 3a and 3b are held in their fully retracted position shown in FIG. 4 by the forces executed by compression springs 31. As shaft 9 continues to move upward, frame 6 remains stationary against stops 94 and actuator block 4 further compresses springs 31. Simultaneously, the upward movement of shafts 16-1 and 16-4 with actuator block 4 causes general plane motion of the links attached thereto. The links simultaneously both rotate on their attaching shafts (16-1 through 16-4) and on shafts 25, which attach the links to seal plates 3a and 3b, and translate in planes parallel to the axis of shaft 9. This combination of motions extends the links to the extended position shown in FIG. 3. Rollers 21 rolling on upper guide surfaces 92U assure that seal plates 3a and 3b move linearly until seal plates 3a and 3b are in the closed (extended) position shown in FIGS. 1-3. Because seal plates 3a and 3b move in a straight line perpendicular to the central axis of shaft 9 and also perpendicular to surfaces 1a and 1b of housing 1, seal plate O-rings 42a and 42b are compressed without any sliding motion. In particular, the motion of the seal plates is perpendicular to these O-rings at the moment of sealing. This assures clean operation and long-life for O-rings 42a and 42b. Extension springs 32-1 and 32-2 continuously apply retracting forces on seal plates 3, thus eliminating any possible backlash in the valve mechanism.

To open the valve, the actuator 48 causes movement of shaft 9 in the direction shown by arrow B in FIG. 4. Downward movement of shaft 9 first causes retraction of sealing plates 3a and 3b as the links attached between the seal plates and shaft 16-1 through 16-4 again undergo general plane motion, including rotating on their attaching shafts and increasing their angle of inclination with respect to the horitontal. Upper guide block 2 is still held in position by springs 31 until seal plates 3a and 3b are in their fully retracted position. From this moment on, further downward movement of shaft 9 causes the entire valve assembly 101 to move in a downward direction. This sequence of motions assure that there is no sliding of O-rings at the time of breaking the seal between sealing plates 3a and 3b and interior surfaces 1a and 1b, respectively. It also ensures that no rotational forces are exerted on O-rings 42a and 42b.

It is important to observe that in the above embodiment, the links connecting seal plates 3a and 3b to actuator block 4 are never fully extended, i.e., even when seal plates 3a and 3b are fully extended (FIG. 3), the links are inclined at a non-zero angle with respect to the horizontal, which angle increases as the seal plates 3a and 3b are moved to the open position (FIG. 4). This feature improves valve life by reducing stress on O-rings 42a and 42b and on the entire linking mechanism. This feature has also contributed to the extremely high reliability of the valve mechanism which has achieved over 2.5 million cycles without a failure. In other embodiments the valve mechanism may be dimensioned so that the links are fully extended (parallel to the horizontal) when the seal plates are extended or so that the attaching shafts 16-1 through 16-4 lie above their respective shafts 25 when the plates are fully extended, but this is not preferred.

Valve 100 is equipped with locking mechanism 110 which prevents shaft 9 from moving downward (in direction B) in the event of loss of pressure to air cylinder 48. FIG. 1 shows locking mechanism 110 in its locked position with hard balls (e.g., of steel or ceramic) 51 jammed between taper 11 and the internal hard surface of housing 14 by the compressional force of spring 33 pressing ring 12 upward.

Locking mechanism 110 includes base ring 13 which is rigidly fixed to shaft 9, compression spring 33, locking ring 12, a plurality of balls 51 which rest on top surface 12s of locking ring 12, taper 11, unlocking ring 10, retaining rings 50 and lock control air cylinder 120. Retaining ring 50a is bowed to spring load taper 11, eliminating clearance between taper 11 and retaining ring 50 above it. Antirotation pin 37 prevents rotation of body 95 of cylinder 120 with respect to shaft 9. Fittings 55 and 56 are air supply fittings for air cylinder 120.

Compression spring 33 is seated in an annular groove in base ring 13 and supports locking ring 12 which is free to move with respect to shaft 9. Locking ring 12 is generaly ring-shaped. Ring 12 has a groove in its lower surface for receiving compression ring 33 and its top surface 12s has a conical shape, i.e., is slopped downward toward the center of ring 12 (at an angle of approximately 5° in one embodiment). Taper 11 is a ring-shaped piece rigidly attached to shaft 9 which has a conically tapered outer surface 11s. Unlocking ring 10 is rigidly attached to body 95 of lock control air cylinder 120 by screws 67. Piston 96 of lock control air cylinder 120 is rigidly attached to shaft 9 so as to prevent vertical motion with respect to shaft 9.

When pressure is not present under piston 96, locking mechanism 110 is in the position shown in FIG. 1 with balls 51 being forced simultaneously against taper 211 and the internal surface of housing 14 by the compressive force of spring 33 pressing against ring 12.

When air pressure is present beneath piston 96, cylinder body 95 and unlocking ring 10 attached thereto by screws 67 are forced downward with respect to shaft 9. The downward movement of unlocking ring 10 causes balls 51 to move downward and away from contact with the interior surface of housing 14 due to the angle of inclination of taper 11 with respect to the vertical (8° in one embodiment) and the slope of surface 12s. The locking mechanism is then in its unlocked position with balls 51 trapped between locking ring 12, unlocking ring 10 and taper 11. In this position, cylinder body 95, locking ring 10, balls 51, taper 11, locking ring 12, spring 33 and base ring 13 are free to move up and down with shaft 9. When pressure beneath piston 96 is withdrawn, spring 33 forces locking ring 12 and balls 51 upward locking shaft 9 as balls 51 are forced between the interior surface of housing 14 and taper 11.

Jack screw 65 is provided for manual release of the locking mechanism.

In one embodiment which further increases the life of the valve, the valve is capable of being operated at two different pressure levels: a low pressure level for normal operation when the same pressure is present in chambers $C_1$ and $C_2$ and a high pressure level for emergencies and to seal against atmospheric pressure in one of chambers $C_1$ and $C_2$ and a vacuum in the other.

Figure 6:
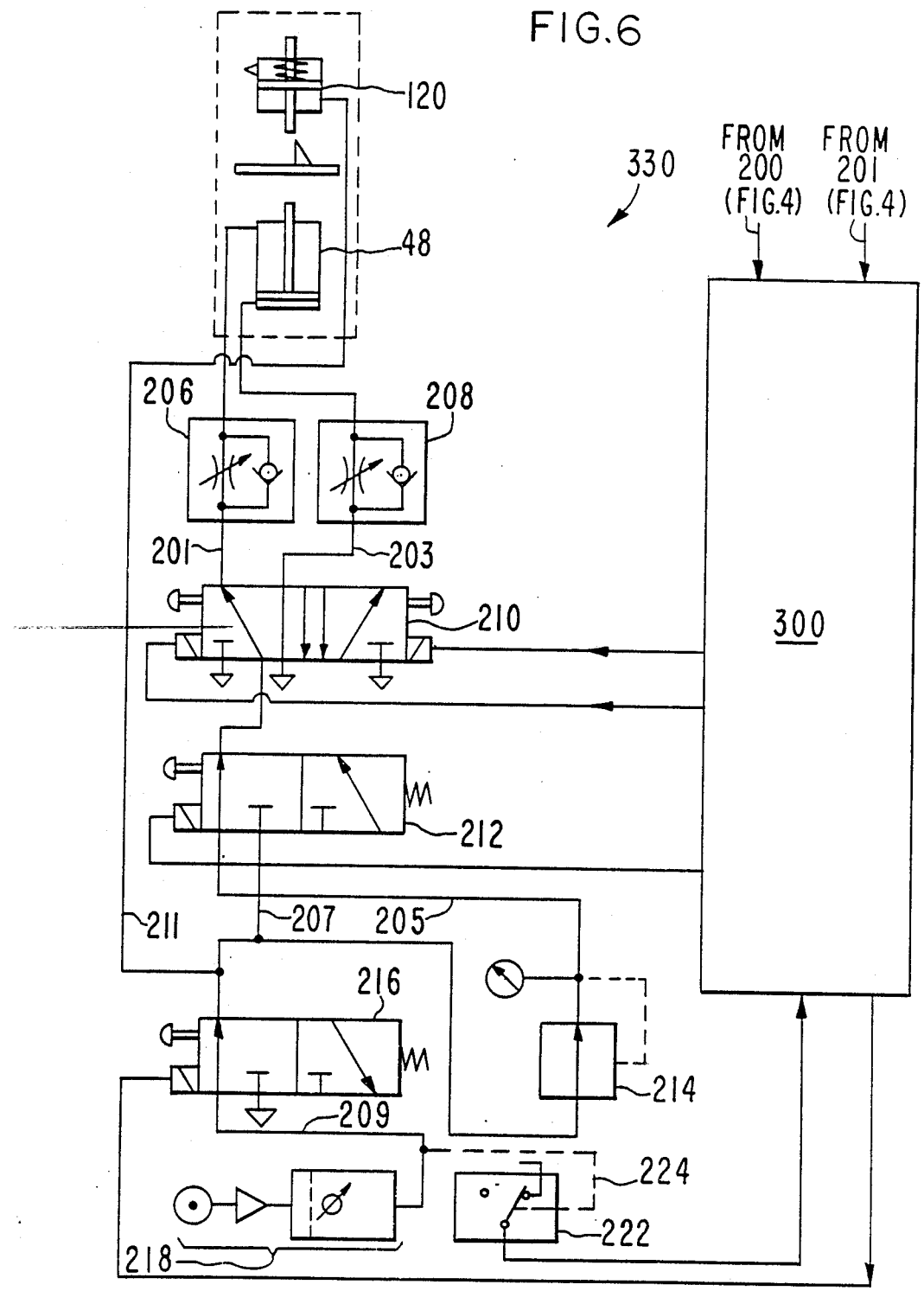
FIG. 6 shows a schematic diagram of pneumatic mechanism 330 for driving valve 100 of FIG. 1.

FIG. 6 shows a pneumatic schematic which describes one embodiment of pneumatic mechanism 330 which is capable of operating at two different pressure levels. Controller 300 controls the operation of pnematic mechanism 330 which controls air supply to air cylinders 48 and 120. Pneumatic mechanism 330 includes flow control valves 206 and 208, direction control valve 210, pressure selection valve 212, pressure regulator 214, air on-off valve 216, air supply 218, pressure switch 222 and controller 300.

Flow control valves 206 and 208 control the flow rate on air lines 201 and 203 and hence, the speed with which valve 100 opens and closes. Direction control valve 210 has an "open" position (shown in FIG. 6) in which air is supplied via line 201 above the piston of air cylinder 48 and a "close" position in which air is supplied via line 203 below the piston of air cylinder 48, thus opening and closing valve 100, respectively.

Pressure selection valve 212 has a first position (shown in FIG. 6) which connects low pressure line 205 from pressure regulator 214 to direction control valve 210 and a second position which connects high pressure line 207 to direction control valve 210.

FIG. 6 shows pneumatic mechanism 330 in its low pressure mode wherein high pressure air (e.g., 80 psi) from air supply 218 is blocked by pressure selection valve 212 and proceeds to pressure regulator 214 which supplies air at a reduced pressure (45 psi in one embodiment) via line 205. This air at a reduced pressure proceeds via pressure selection valve 212 and direction control valve 210 to air cylinder 48.

Pressure switch 222 receives on line 224 air at the pressure of the air supply output of air supply 218 (nominally 80 psi in one embodiment). Pressure switch 222 is preset at a selected trip point (e.g., 70 psi). Whenever pressure switch 222 detects that the pressure supplied by air supply 218 is less than the trip point pressure, a signal is provided to controller 300 which causes on-off valve 216 to switch to the off position (not shown in FIG. 6) which blocks the high pressure air supply on line 209 and simultaneously vents air cylinder 120 via line 211 causing locking of locking mechanism 110. This provides a safety mechanism to prevent the valve from operating at unsuitable pressures.

The sensors 200 and 201 (FIG. 4) in chambers $C_1$ and $C_2$ sense the pressure in chambers $C_1$ and $C_2$, respectively, and provide signals representative of these pressures to controller 300 (FIG. 6). If either of these signals indicate a pressure exceeding a selected threshold value (e.g., 50 microns) which indicates a degradation of the vacuum in chamber $C_1$ or $C_2$, controller 300 switches pressure selection valve 212 to the high pressure mode which connects high pressure line 207 to direction control valve 210.

The ability to operate at different selected pressure levels increases the life of valve 100 by reducing stress on valve parts.

While the above embodiment has two sealing plates, the valve of the invention is also operative with a single sealing plate, for example, sealing plate 3a. In this embodiment, sealing plate 3b in links $L_b1$ through $L_b4$ are not present and extension springs 32-1 and 32-2 are connected between plates 3a and actuator block 4.

The above embodiments are meant to be exemplary and not limiting and many substitutions and modifications will be obvious to one of average skill in the art in the light of the above disclosure without departing from the scope of the invention.

What is claimed is:

1. A mechanism for selectively locking and unlocking a translatable shaft comprising a spring mechanism concentric with the shaft, a member fixed to the shaft, said member having an inclined surface, a wall concentric with the shaft, a set of balls, an assembly for the balls, the balls and assembly being translatable together with respect to the shaft and the inclined surface between a first position where the balls are jammed between the inclined surface and the wall by the spring mechanism exerting a first force in a first direction along the shaft axis against the inclined surface and a second position where the balls are not in contact with the inclined surface, the shaft being in locked and unlocked conditions while the balls and assembly are respectively in the first and second positions, and means for selectively exerting a second force against the assembly in a second direction, the second force being greater than the first force applied to the balls and assembly so the assembly and balls are driven by the second force to cause the balls to be driven to the second position, the first and second directions being opposite to each other along the direction of the shaft axis.

2. The mechanism of claim 1 wherein the assembly includes first and second fingers respectively extending in the first and second directions against diametrically opposed surfaces of the balls so the balls are captured between the first and second fingers while the balls are at and being driven between the first and second positions.

3. The mechanism of claim 2 wherein the assembly includes first and second faces at right angles to the shaft axis and on opposite sides of the balls, the spring exerting a force in the first direction against the first face to tend to drive the assembly and balls to the first position, the means for selectively exerting the second force applying the second force in the second direction against the second face to drive the assembly and balls in the second direction.

4. The mechanism of claim 3 wherein the second force exerting means includes a variable volume chamber having one wall defined by said second face, and means for selectively applying fluid to said chamber to drive the second face in the second direction.

5. The mechanism of claim 4 further including means for preventing turning of said second face and second fingers relative to the shaft.

6. The mechanism of claim 5 further including means for manually releasing the shaft from the locked condition provided by the balls being jammed between the inclined surface and the wall concentric with the shaft.

7. The mechanism of claim 6 wherein the means for manually releasing includes a jack screw.

8. The mechanism of claim 1 further including means for manually releasing the shaft from the locked condition provided by the balls being jammed between the inclined surface and the wall concentric with the shaft.

9. The mechanism of claim 8 wherein the means for manually releasing includes a jack screw.

10. A mechanism for selectively locking and unlocking a translatable shaft comprising a housing having a cylindrical inner wall concentric with the shaft, a plate fixed to the shaft, the plate including an inclined surface, and assembly translatable relative to the shaft, the assembly including first and second faces at right angles to the shaft respectively on opposite sides of the inclined surface, the assembly including a plurality of balls translatable with the assembly between first and second positions, the inclined surface being arranged so there is greater space between the inner wall and a first end of the inclined surface in proximity to the first face than between the inner wall and a second end of the inclined surface in proximity to the second face, the balls while in the first position being in proximity to the second end and jammed between the inclined surface and the inner wall to lock the shaft in place and while in the second position being remote from the second end and free of the inclined surface so that the shaft is locked in situ and is free to translate while the balls are respectively in the first and second positions, means for exerting a first force axial to the shaft in a first direction against the first face to drive the assembly so the balls are at the first position, and means for selectively applying a second force axial to the shaft in a second direction against the second face to drive the housing so the balls are at the second position, the first and second directions being opposite to each other.

11. The mechanism of claim 10 wherein the first force exerting means includes a spring having one end pressing against the first face, the second force applying means applying a greater force to the second face than is applied by the spring.

12. The mechanism of claim 11 wherein a second end of the spring is fixedly held in situ relative to the shaft so the second end of the spring translates with the shaft.

13. The mechanism of claim 12 wherein the second force applying means includes a variable volume chamber having one wall defined by the second face, and means for selectively applying fluid to said chamber to drive the second face in the second direction.

14. The mechanism of claim 13 wherein the assembly includes first and second fingers respectively extending in the first and second directions against diametrically opposed surfaces of the balls so the assembly is captured between the first and second fingers while the assembly is at and being driven between the first and second positions.

15. The mechanism of claim 14 further including means for preventing turning of said second face and second fingers relative to the shaft.

16. The mechanism of claim 15 further including means for manually releasing the lock for the shaft provided by the balls being jammed between the inclined surface and the inner wall concentric with the shaft.

17. The mechanism of claim 16 wherein the means for manually releasing includes a jack screw.

18. The mechanism of claim 10 wherein the second force applying means includes a variable volume chamber having one wall defined by the second face, and means for selectively applying fluid to said chamber to drive the second face in the second direction.

19. The mechanism of claim 10 wherein the assembly includes first and second fingers respectively extending in the first and second directions against diametrically opposed surfaces of the balls so the assembly is captured between the first and second fingers while the assembly is at and being driven between the first and second positions.

20. The mechanism of claim 19 further including means for preventing turning of said second face and second fingers relative to the shaft.

21. The mechanism of claim 20 further including means for manually releasing the lock for the shaft provided by the balls being jammed between the inclined surface and the inner wall concentric with the shaft.

22. The mechanism of claim 21 wherein the means for manually releasing includes a jack screw.

* * * * *